Figure 2:
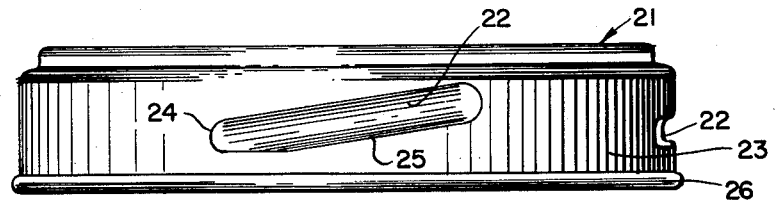

May 11, 1965  A. B. FOYE  3,182,843
CLOSURE FOR CONTAINERS
Filed Jan. 2, 1964

United States Patent Office 3,182,843
Patented May 11, 1965

3,182,843
CLOSURE FOR CONTAINERS
Allen B. Foye, West Bridgewater, Mass., assignor to W. R. Grace & Co., Cambridge, Mass., a corporation of Connecticut
Filed Jan. 2, 1964, Ser. No. 335,292
1 Claim. (Cl. 215—44)

This invention relates to containers and to their closures which are generically known as screw caps, and specifically to containers and closures in which the means which secure the closure to the container is of the "multi-start" type. Although, in the following specification a glass container and its metal closure will be set forth as the preferred example, it will be obvious that the invention is equally applicable to containers and closures made of metal or plastic and such materials are included within the scope of this invention.

In so-called "screw-cap" containers, the exterior neck finish frequently includes three (or more) "leads" which form, in effect, an interrupted screw thread. By engaging the leads either with matching lugs or a thread rolled in the skirt of the closure, the closure may be screwed onto the container and the container thereby will be securely sealed. Since each of the leads runs downward at the same angle, a closure may start its turndown at any one of the three or more points.

It is possible to mis-handle such closures in the closing operations in at least three rather subtle ways, all of which result in ineffective seals. The difficulty comes about because the sealing composition which is positioned about the internal periphery of the closure and forms the hermetic seal when the closure is screwed down onto the glass must be a distortable substance and usually is thermoplastic. In consequence, if the following adjustments of the closing machinery are not under close control, the cap may be driven so far down on the glass that the sealing ring is cut through and the seal is thereby destroyed.

The first misadjustment can occur in the turndown device. If an excessive angular motion is permitted, the cap will overrun the designed turndown allowance and force the rim of the container so deeply into the ring of sealing composition that it may "cut through." The second misadjustment may come about in setting the counterbalancing head pressure. As the first step in cooling, to counterbalance the internal pressure in a jar which is at sterilizing temperature, it is customary to run a counterbalancing pressure of compressed air into the retort and maintain this counterbalancing pressure as the jars are allowed to cool. If that pressure is too high, the caps will settle too deeply into the sealing ring, and leaks will then occur.

The third cause of difficulty is a matter of mis-handling. When the jars are removed from the retort, even after the so-called cooling they are still quite warm and the sealing ring is more plastic than at room temperature. If the jars are loaded on pallets, there is a great temptation to stack the jars too high. The lower jars in the stack are thus subject to too heavy a downward pressure. Consequently improper pallet loading will cause cut-through of the sealing ring.

It is the practice of certain closure manufacturers in their attempt to offset these errors which occur in the packing plan to make the sealing composition very hard—so hard in fact that an effective seal cannot be made unless the head-space of the container is filled with live and frequently super-heated steam as the cap is turned into its sealing position. This practice is effective but the caps cannot be used except with steam closing machinery and consequently do not have as broad a range of adaptability to varied closing practices as could be desired.

It is the purpose of this invention to produce a container and its associated closure having a means which will prevent excessive turndown and also means which will prevent cut-through which is the result of excessive head pressure or excessive pallet loading. As a result of this invention, it is possible to use a much softer composition. To do so possesses the following advantages: it will form an effective seal against the sealing surface of glass, metal, or plastic finishes which are somewhat rough or uneven (a condition often found in glass containers made in areas which have not yet installed highly developed glass manufacturing machinery). It permits the easy application of the cap even by hand and, importantly, it reduces the force which is necessary to remove the cap from the container.

Figure 1:
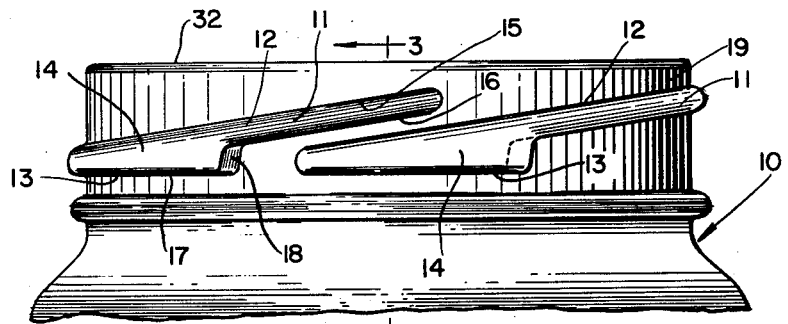
Figure 3:
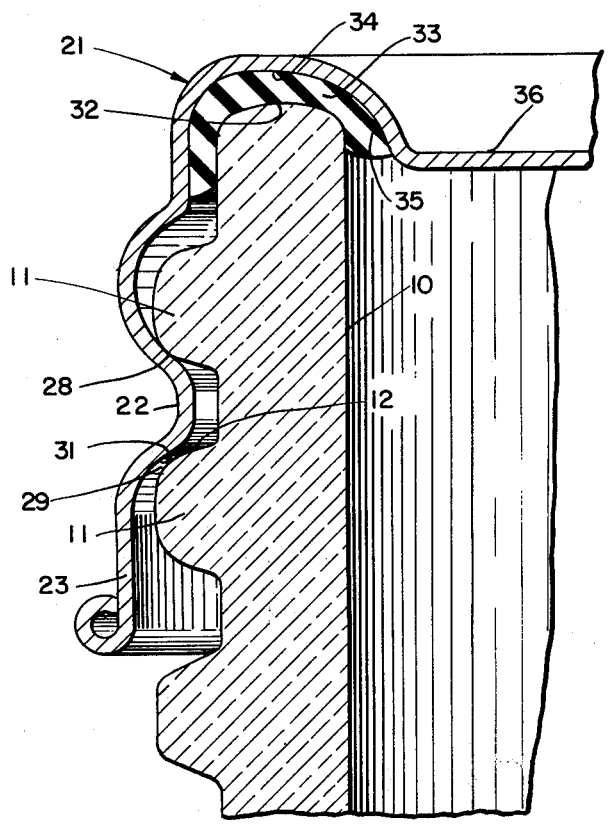

In the drawings:
FIG. 1 is an elevation of the mouth portion of a three-start threaded jar finish showing the modified leads.
FIG. 2 is an elevation of the closure for the jar of FIG. 1.
FIG. 3 is an enlarged vertical section of a portion of the closure and the jar of FIGS. 2 and 3 when in the fully sealed position.

Referring to FIG. 1, instead of the normal threads or leads molded in the glass finish, the jar 10 of the present invention is provided with leads 11—11 of modified shape. The upper margins 12—12 of leads 11—11 are continuous and descend at a normal pitch. The lower margins 13—13 of the leads 11—11 are formed in two portions: (1) a head portion 14 and (2) a tail or normal lead portion 15; the lower margin 16 of the tail is parallel to the upper margin 12. Head portion 14 has a substantially horizontal lower margin 17 which extends for approximately ½ the length of the total lead, but then the margin turns steeply upwards to merge into the tail or lead portion 15. The cross section of the lead, save for the head portion 14, is approximately semi-circular. The end wall 18 which connects the lead portion 15 to the horizontal lower margin 17 is a flat, outwardly projecting surface occupying substantially a radial plane. Consequently it forms a definite stop which projects outwardly from the cylindrical glass finish 19.

Referring to FIG. 2, the closure 21 carries a matching number of indentations 22—22 in its skirt 23, the margins of which are inclined at the lead angle. Roughly, these are the reversed and mating form of the leads 11—11. The forward (left-hand) portion 24 of the indentation 22 is made narrow enough to fit between two of the leads 11—11 which, as is shown in FIG. 1, overlap to a material extent. At approximately ⅓ of its length, the lower margin 25 of the indentation 22 drops downwardly towards or is of lesser angle to the wire edge or curl 26 of the closure skirt 23 and forms an abutment 24 which in turndown bears up against the end wall 18 of the lead 11. When this abutment 24 comes into contact with the end wall 18 it is impossible to turn the cap further and to overrun the proper amount of turndown. The end wall 18 may, as described, be a flat surface occupying a radial plane, but a slight range of turndown will be permitted if the wall 18 and the abutment 24 are formed as secants. Then locking is secured by the mutual action of a pair of sliding wedges and the cap in turndown comes to a positive stop as the wedges lock together.

Prevention of cut-through which is due to top loading is secured by the following means:

Referring to FIG. 3, which is an approximate ten-fold enlargement of a partial section through the jar and closure, it will be seen that the points of contact between the closure 21 and the lead 11 occurs at the point 28 on the lower margin 16 of the upper lead 11. It will also be noticed that the skirt 23 stands away from the lower lead 11 leaving a narrow space 29 between the lower, inner wall 31 of the indentation 22 and the upper margin 12 of the lower lead 11. This space represents the permitted distance that the "sealing surface" (the rim or container mouth) 32 may project into the sealing composition 33. If the head pressure is excessive, the cap will be driven downwardly and the glass will be seated further into the sealing composition 33. But when the cap moves downwards a distance equal to the space 29, the inner, lower wall 31 of the indentation comes into contact with the upper margin 12 of the lower lead 11 and stops all further downward movement. Therefore, whether the top loading occurs by reason of excessive counterbalancing pressure or is due to placing too many layers of jars on the pallet, the cap cannot be driven-down on the glass far enough to cut through the sealing composition 33 and so cause the jar to leak.

It is of considerable advantage to make the peripheral channel 34 of the closure 21 in which the sealing composition 33 is placed, comparatively deep and comparatively narrow, for the interior wall 35 of the channel 34 then presses back on the sealing composition 33. Very little of the sealing composition can spread across the panel 36 and consequently only a small area of sealing composition is exposed to the contents of the jar.

The invention eliminates completely the sealing failures which are due to cut-through at the packing plant, and avoids the dangers of food spoilage from this cause. End wall 18 working in conjunction with its mating abutment 24 on the closure prevents excessive turndown. And whenever the lower margin of the indentation 22 rests on the top margin 12 of the second lead 11, cut-through due to top loading is prevented.

Closures of this type may be successfully used with a variety of closing techniques. They may be applied by hand on jars containing products such as pickles which are closed cold; they may be applied in conventional vacuum closing machines, and they are equally suitable for steam-closing techniques. Because the sealing composition can safely be soft rather than hard and dense, it will be found that the caps can be more easily unscrewed than when compositions especially formulated to resist excessive turndown and top loading have been used.

I claim:

The combination of a container and a cooperating skirted closure wherein the container is provided with a mouth portion having interrupted, overlapping closure-retaining leads projecting from the exterior finish wall of the said container, each of said leads having a tail portion and a head portion, the head of each lead lying beneath the tail of the succeeding lead, the upper margin of said portions being continuous and inclined downwardly from tail to head, the lower margin of the head portion lying in a substantially horizontal plane, the said head portion having a substantially vertical margin rising from its said lower margin to join the said tail portion and forming an abutment, the cooperating closure having a distortable and compressible sealing ring and a plurality of inwardly directed indentations, each indentation having a vertical dimension slightly less than that of the spacing between any two of the said overlapping leads, whereby excessive turn-down of the closure is prevented by contact of the end of the indentations with the abutments and cutting through the sealing ring as the rim of said container is forced into the sealing ring by reason of excessive head pressure is prevented by contact of the lower margin of the said indentations with the upper margin of the said lower positioned leads.

References Cited by the Examiner

UNITED STATES PATENTS

| | | | |
|---|---|---|---|
| 942,141 | 12/09 | Hoffman | 215—44 |
| 1,499,612 | 7/24 | Hammer | 215—44 |
| 1,626,917 | 5/27 | Carvalho | 215—44 |
| 2,265,015 | 12/41 | Watson | 215—44 |
| 2,916,175 | 12/59 | Acton | 215—44 |

FRANKLIN T. GARRETT, *Primary Examiner.*